No. 723,002. PATENTED MAR. 17, 1903.
C. L. MOORE.
OPERATING VALVE.
APPLICATION FILED AUG. 10, 1901.
NO MODEL.

Witnesses
M. Bloudel
Charles Shaw

Inventor
C. L. Moore.
By
Attorneys

THE NORRIS PETERS CO., PHOTO-LITHO., WASHINGTON, D. C.

UNITED STATES PATENT OFFICE.

CALVIN L. MOORE, OF LEBANON, PENNSYLVANIA, ASSIGNOR OF ONE-HALF TO EDGAR A. WEIMER, OF LEBANON, PENNSYLVANIA.

OPERATING-VALVE.

SPECIFICATION forming part of Letters Patent No. 723,002, dated March 17, 1903.

Application filed August 10, 1901. Serial No. 71,559. (No model.)

*To all whom it may concern:*

Be it known that I, CALVIN L. MOORE, a citizen of the United States, residing at Lebanon, in the county of Lebanon and State of Pennsylvania, have invented a new and useful Improvement in Operating-Valves, of which the following is a specification.

This invention is a valve adapted to be used in connection with a piston operated either by means of compressed air, steam, or other medium.

The object of the invention is to provide a simple and effective mechanism for quickly and easily operating the valve in either direction; and with this object in view the invention consists in the peculiar construction of the various parts and in their novel combination or arrangement of parts, all of which will be fully described hereinafter and pointed out in the claims.

Figure 1:
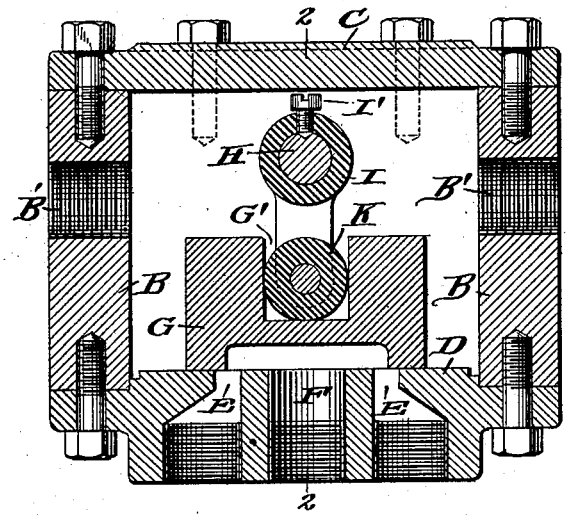
Figure 2:
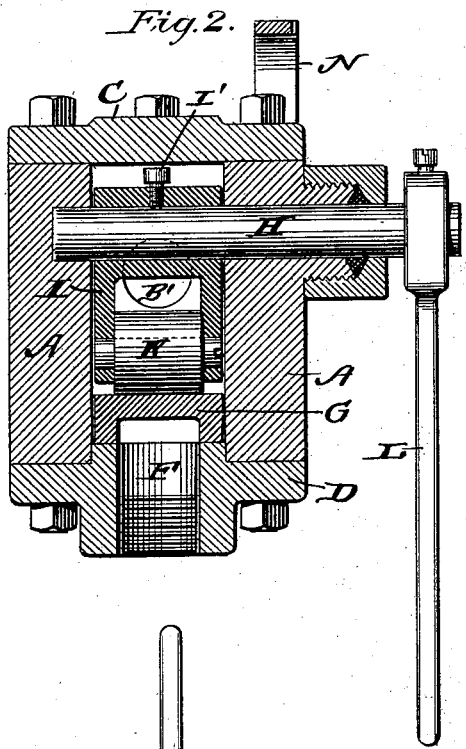
Figure 3:
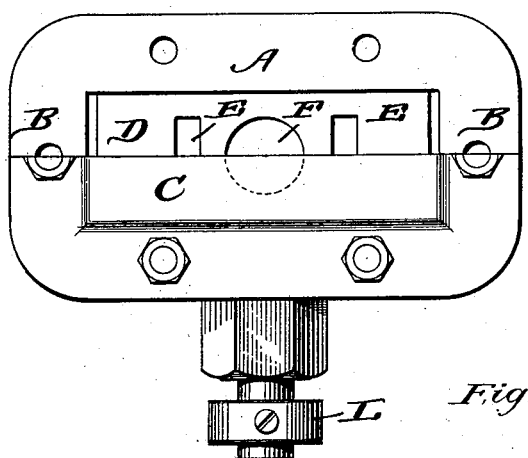
Figure 4:
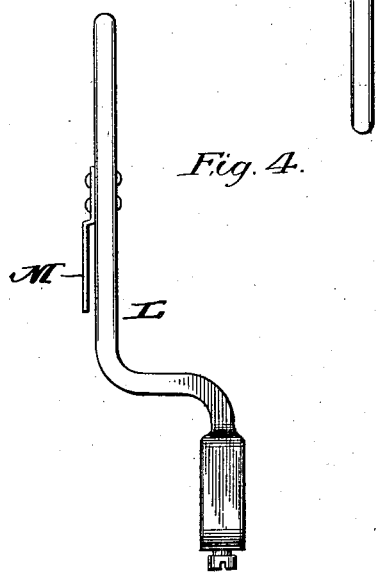
Figure 5:

In the drawings forming part of this specification, Figure 1 is a longitudinal sectional view of a valve-chamber and valve. Fig. 2 is a section on the line 2 2 of Fig. 1. Fig. 3 is a top view with part of the top broken away. Fig. 4 is a slightly-modified form of lever, and Fig. 5 is a view of the sector for locking the lever.

In carrying out my invention I employ a valve chest or chamber, preferably constructed of cast metal and comprising the sides A, the ends B, the top C, and the bottom D, said parts being securely bolted together, as most clearly shown. The ends B have threaded openings B' to receive the supply-pipes, and the bottom is formed with the end ports E and the central or exhaust port F, the upper face of the bottom serving as a seat for the valve G. The port-openings communicate with threaded bores into which are screwed pipes carrying the operating or exhaust medium. The valve G is adapted to travel back and forth upon its seat, and in order to so operate the valve I employ a stem or shaft H, which passes horizontally through one of the sides and has a bearing in the opposite side, said shaft or stem having a rocker-arm I rigidly fastened thereto by means of a set-screw I'. This rocker-arm I is of such length as to snugly fit within the valve chest or chamber. The free end of this rocker-arm is bifurcated and carries a steel roller K, which roller is located in the recess G', produced in the upper face of the valve. An operating lever-handle L is mounted upon the outer end of the stem or shaft, so that by swinging the handle or lever in one direction or the other the rocker-arm is operated, shifting the valve so as to open one port and close the other and permit the exhaust to pass into the central opening.

In Fig. 1 the valve is shown in the neutral or closed position, the handle hanging perpendicular. In Fig. 4 I have shown the handle or lever as crooked or bent and provided with a spring-tongue M, adapted to engage the toothed sector N, which is arranged upon the top of the case or chamber, and the operating-handle would then be arranged upright instead of depending, as shown.

This valve is particularly adapted for use in connection with friction clutch mechanism, which clutch mechanism is operated by means of a piston carried within the cylinder; but inasmuch as the construction of the cylinder and mechanism connected therewith form no part of my invention I have not deemed it necessary to illustrate it. By means of a valve constructed and operated as herein shown and described I am enabled to quickly supply the necessary pressure to the piston and can cut off the supply equally as quick, thereby economizing in the operating medium and also avoiding undue wear of the parts. The valve is virtually self-grinding and is held firmly to its seat by means of the pressure within the chest or chamber.

Having thus fully described my invention, what I claim as new, and desire to secure by Letters Patent, is—

In a valve, the combination with the chest or casing, outlet and inlet ports therein, of a valve having a recessed top, a valve-seat in the bottom of said casing on which said valve rests, a rock-shaft journaled in the sides of said casing and having a bifurcated rocker-arm thereon, an antifriction-roller journaled in said bifurcated arm and entering said recess in said valve whereby to operate the same to control said ports, an operating-lever on said rock-shaft, a spring-tongue on said operating-lever and a notched section coöperating with said tongue to secure said lever in any desired position, substantially as described.

CALVIN L. MOORE.

Witnesses:
ALBERT H. GREINER,
EDWARD ALTENDERFER.